US 6,636,808 B1

(12) United States Patent
Brown et al.

(10) Patent No.: US 6,636,808 B1
(45) Date of Patent: Oct. 21, 2003

(54) MANAGING AN ENVIRONMENT VIA A UNIVERSALLY ACCESSIBLE SERVER SYSTEM

(75) Inventors: Michael Wayne Brown, Georgetown, TX (US); Kelvin Roderick Lawrence, Round Rock, TX (US); Michael A. Paolini, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/560,161

(22) Filed: Apr. 28, 2000

(51) Int. Cl.⁷ .................................................. G01W 1/02
(52) U.S. Cl. ........................................ 702/3; 236/1 C
(58) Field of Search ............................ 702/3, 183, 188, 702/99, 33; 236/1 C, 44 R, 44 A, 91 R, 91 C, 91 D, 91 E, 91 F, 94, 99 A, 99 E; 374/10, 110, 11; 432/36; 700/9, 17, 83, 108, 298, 299

(56) References Cited

U.S. PATENT DOCUMENTS

| | | |
|---|---|---|
| 4,388,616 A | 6/1983 | Machida |
| 4,897,798 A | 1/1990 | Cler |
| 4,916,642 A | 4/1990 | Kaiser et al. |
| 5,170,935 A | 12/1992 | Federspiel et al. |
| 5,204,961 A | 4/1993 | Barlow |
| 5,311,451 A | 5/1994 | Barrett |
| 5,410,471 A | 4/1995 | Alyfuku et al. |
| 5,544,036 A | 8/1996 | Brown, Jr. et al. |
| 5,604,800 A | 2/1997 | Johnson et al. |
| 5,621,662 A | 4/1997 | Humphries et al. |
| 5,682,949 A | 11/1997 | Ratcliffe et al. |
| 5,742,920 A | 4/1998 | Cannuscio et al. |
| 5,751,916 A | 5/1998 | Kon |
| 5,761,085 A | 6/1998 | Giorgio |
| 5,793,646 A | 8/1998 | Hibberd et al. |
| 5,798,945 A | 8/1998 | Benda |
| 5,848,378 A | 12/1998 | Shelton et al. |
| 5,860,068 A | 1/1999 | Cook |
| 5,892,690 A | 4/1999 | Boatman et al. |
| 5,971,597 A | 10/1999 | Baldwin et al. |
| 6,055,480 A | 4/2000 | Nevo et al. |
| 6,216,956 B1 | 4/2001 | Ehlers et al. |

OTHER PUBLICATIONS

Daniel Hays; "Smoke Detectors in Cyberspace"; Jul. 1997.
IECON '98; Michael Pauly; "Monitoring Indoor Environment Using Intelligent Mobile Sensors".

Primary Examiner—Marc S. Hoff
Assistant Examiner—Edward Raymond
(74) Attorney, Agent, or Firm—Marilyn Smith Dawkins; Bracewell & Patterson, L.L.P.

(57) ABSTRACT

According to the present invention, environment indicators computed for a particular environment are converted into a common transmittable data format, wherein each of the environment indicators is computed by an electronic environment measurement device from among multiple diverse electronic environment measurement devices. The environment indicators are transmitted in the transmittable data format to a universally accessible server system in association with a particular universal identifier for a particular user. The universally accessible server system analyzes each of the environment indicators according to an environment sensitivity profile stored within the universally accessible server system in association with the universal identifier. Control signals are determined at the universally accessible server system for adjusting multiple environment control systems that control the particular environment in response to the analysis. The particular environment is adjusted as controlled by the environment control systems according to the control signals, such that a particular environment is temporarily managed via a universally accessible server system according to an environment sensitivity profile associated with a particular user.

55 Claims, 10 Drawing Sheets

Fig. 4

| Environment Indicator measurement | Date/Time | Measurement unit | Environment zone |
|---|---|---|---|
| ... | 11/12/2000/06:10:20 | Particles/cubic inch of smoke | Building 30 |
| 30 | ... | ... | ... |
| 200 | 11/13/2000/07:15:12 | Particles/cubic inch of smoke | Building 30 |

Fig. 5

| Type of measurement to take | Date/Time | Range | Automatic transmission to: | Environment zone |
|---|---|---|---|---|
| ... | ... | ... | ... | ... |
| Carbon monoxide | 11/18/2000/10:00:00 | 00:05:00 | Server A | Lake X |
| Carbon dioxide | 11/18/2000/10:00:00 | 00:01:00 | Server A | Lake Y |
| Pure oxygen | 11/18/2000/10:00:00 | 00:00:30 | Server B | Lake Z |

| User ID | Password | ... | Health restrictions | Output preference |
|---|---|---|---|---|
| GeorgeG | 45ghr5 | ... | No smoke levels greater than 30 particles/cubic inch | Colorblind ready |
| Sylvia | Gen234 | ... | No oxygen levels less than 90% pure oxygen | Large font |
| ... | ... | ... | ... | ... |

| Environmentally sensitive device | Environmental sensitivities | Environment zone |
|---|---|---|
| Machine 1 | Temperature > 90 Humidity > 50% | Zone 1 |
| Machine 2 | Temperature < 60 Humidity < 20% | Zones 1 and 2 |
| ... | ... | ... |

*Fig. 6*

MANAGING AN ENVIRONMENT VIA A UNIVERSALLY ACCESSIBLE SERVER SYSTEM

CROSS-REFERENCE TO RELATED APPLICATIONS

The present application is related to the following co-pending applications, which are filed on even date herewith and incorporated herein by reference:

(1) U.S. patent application Ser. No. 09/560,163; and (2) U.S. patent application Ser. No. 09/560,162.

BACKGROUND OF THE INVENTION

1. Technical Field

The present invention relates in general to an environmental monitoring device and in particular to a method, system and program for monitoring and managing an environment. Still more particularly, the present invention relates to a method, system and program for managing a particular environment according to environmental sensitivities of a particular user from a universally accessible server system in association with a particular universal identifier.

2. Description of the Related Art

Conventional electronic environmental measurement devices provide for taking measurements that are computed to reflect a portion of the environment such as amounts of smoke, carbon dioxide, carbon monoxide, oxygen, radiation, temperature, wind speed, humidity, etc. that are in a constrained portion of the environment. Environmental measurements can be taken in solids, liquids and gases and in a constrained area or in a non-constrained area. In particular, an electronic environmental measurement device is able to translate a measurement, such as the speed of a propeller driven by the wind, into a numerical output. Numbers computed by calibrated electronic environmental measurement devices are associated with a scale of measurement that has been assigned to that type of environmental measurement. An individual may be able to consult a chart or other documentation to discern the meaning and/or implication of the computed number. For example, a computed wind speed may be compared by an individual with a chart containing advisories based on a range of wind speeds.

While conventional environmental measurement devices provide a computed number that can be utilized by an individual or group to monitor a particular portion of the environment, there is a need for electronically documenting the measured data in a timely manner. In addition, while some electronic environmental measurement devices do provide for electronically documenting the measured data, there is a need to electronically document data from multiple diverse electronic environmental measurement devices such that a comprehensive environmental profile can be determined. For example, while an individual may be able to consult a chart or other textual data to discern the meaning of a number computed by an electronic environmental measurement device, this data is not always available, may not be current, may not provide recommendations for how to respond to particular measurement values, and may not provide analysis of measurements from multiple diverse electronic environmental measurement devices.

Some environmental measurement devices are coupled to a controller that adjusts a particular aspect of a particular environment or process in response to an environment measurement or in response to a preprogrammed setting. For example, a thermostat detects the air temperature of a controlled environment and when the air temperature rises above a threshold temperature, activates an air conditioner to cool the air in the controlled environment until the detected air temperature is less than the threshold temperature. However, for example, by adjusting the humidity in a particular environment or an air speed, the effectual temperature of the particular environment is adjusted. Unfortunately, the prior art does not provide for controlling a humidifier, an air conditioner and a fan by a single device that also knows the environment needs of a user or object detected in the environment. In another example, a smart thermostat may be set to decrease the temperature of a room at a particular time, such as in the evening, and then increase the temperature in the room at another time, such as in the morning. However, a smart thermostat is typically set only for those people living in the house. A smart thermostat does not provide for automatically and temporarily updating the smart thermostat to adjust the temperature of the room where the guest is staying according to the temperature preferences of the guest.

In view of the foregoing, it is desirable that a method, system and program is provided for monitoring multiple diverse electronic environment measurement devices in order to store monitored environmental related data over a period of time, assist the user by analyzing the monitored measurements according to environmental sensitivities of people, machines and other objects within an environment and control the adjustment of the environment according to the environmental sensitivities. In particular, in view of the foregoing, it is desirable that a method, system and program provide for managing a particular environment via a access to a universally accessible database of server systems that includes environmental sensitivities of people, machine and other objects within an environment.

SUMMARY OF THE INVENTION

In view of the foregoing, it is therefore an object of the present invention to provide an improved environment measurement monitoring device.

It is another object of the present invention to provide an improved method, system and program for monitoring and managing an environment.

It is yet another object of the present invention to provide an improved method, system and program for managing a particular environment according to environmental sensitivities of a particular user from a universally accessible server system.

According to the present invention, environment indicators computed for a particular environment are converted into a common transmittable data format, wherein each of the environment indicators is computed by an electronic environment measurement device from among multiple diverse electronic environment measurement devices. The environment indicators are transmitted in the transmittable data format to a universally accessible server system in association with a particular universal identifier for a particular user. The universally accessible server system analyzes each of the environment indicators according to an environment sensitivity profile stored within the universally accessible server system in association with the universal identifier. Control signals are determined at the universally accessible server system for adjusting multiple environment control systems that control the particular environment in response to the analysis. The particular environment is adjusted as controlled by the environment control systems according to the control signals, such that a particular environment is temporarily managed via a universally accessible server system according to an environment sensitivity profile associated with a particular user.

All objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 4 illustrates a block diagram of a data storage structure for the environment indicator storage in accordance with the method, system and program of the present invention;

FIG. 5 depicts a block diagram of a data storage structure for the measurement scheduler in accordance with the method, system and program of the present invention;

FIG. 6 illustrates a block diagram of a data storage structure for environment profiles in accordance with the method, system and program of the present embodiment;

DETAILED DESCRIPTION OF ILLUSTRATIVE EMBODIMENT

The present invention may be executed in a variety of systems, including a variety of computers under a number of different operating systems. In a preferred embodiment of the present invention, a system of network servers, such as Netfinity™ servers (Netfinity™ is a trademark of International Business Machines Corp.) and other data processing systems connected to a network are utilized to house a universally accessible database of server systems. A computer system has access to the network servers. The computer may be, for example, a desktop computer, a network computer, a portable computer, a midrange computer or a mainframe computer. In addition, the computer may be part of a network such as a local-area network (LAN) or a wide-area network (WAN). Therefore, in general, the present invention is preferably executed in a computing device that performs computing tasks such as manipulating data in storage that is accessible to the computing device. In addition, the computing device includes at least one output device and at least one input device.

Figure 1:
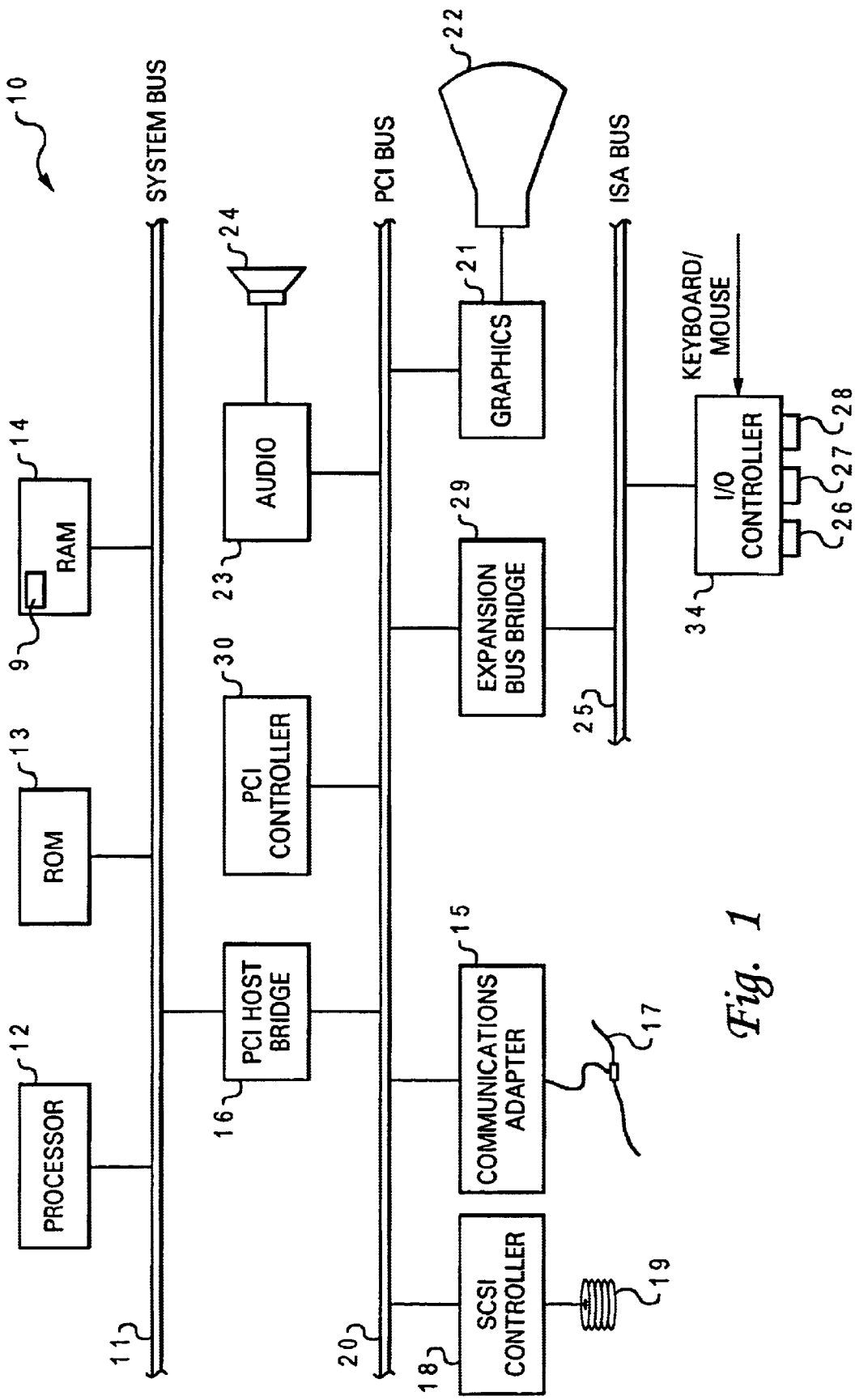
FIG. 1 is a block diagram of a computer system that may utilize a preferred embodiment of the present invention.

Referring now to the drawings and in particular to FIG. 1, there is depicted a block diagram of one embodiment of a computer system that may utilize the present invention. As depicted, data processing system 10 includes at least one processor 12, which is coupled to system bus 11. Each processor 12 is a general-purpose processor, such as IBM's PowerPC™ processor that, during normal operation, processes data under the control of operating system and application software stored in random access memory (RAM) 14 and Read Only Memory (ROM) 13. The operating system preferably provides a graphical user interface (GUI) to the user. Application software contains instructions that when executed on processor 12 carry out the operations depicted in the flowcharts of FIGS. 7, 8, 9, 10, 11 and others described herein.

Processors 12 are coupled via system bus 11 and Peripheral Component Interconnect (PCI) host bridge 16 to PCI local bus 20. PCI host bridge 16 provides a low latency path through which processor 12 may directly access PCI devices mapped anywhere within bus memory and/or I/O address spaces. PCI host bridge 16 also provides a high bandwidth path for allowing PCI devices to directly access RAM 14.

PCI local bus 20 interconnects a number of devices for communication under the control of PCI controller 30. These devices include a Small Computer System Interface (SCSI) controller 18, which provides an interface to SCSI hard disk 19, and communications adapter(s) 15, which interface data processing system 10 to at least one data communication network 17 comprising wired and/or wireless network communications. In addition, an audio adapter 23 is attached to PCI local bus 20 for controlling audio output through speaker 24. A graphics adapter 21 is also attached to PCI local bus 20 for controlling visual output through display monitor 22. In alternate embodiments of the present invention, additional peripheral components may be added. For example, in alternate embodiments, a tactile display component may be provided.

PCI local bus 20 is further coupled to an Industry Standard Architecture (ISA) bus 25 by an expansion bus bridge 29. As shown, ISA bus 25 has an attached I/O (Input/Output) controller 34 that interfaces data processing system 10 to peripheral input devices such as a keyboard and mouse (not illustrated) and supports external communication via parallel, serial and universal serial bus (USB) ports 26, 27, and 28, respectively.

Figure 2:
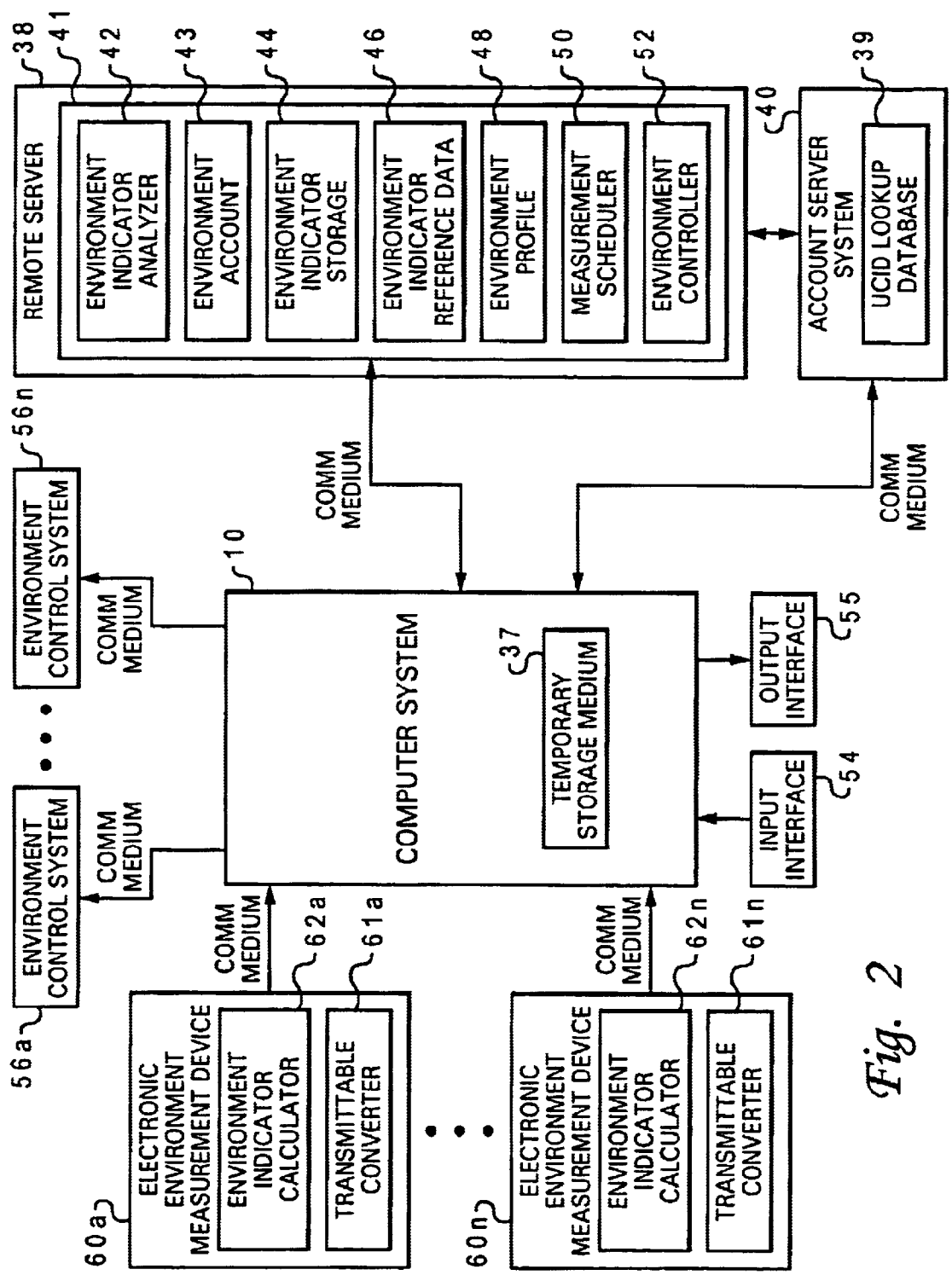
FIG. 2 illustrates a block diagram of one embodiment of an electronic environment management system in accordance with the method, system and program of the present invention.

With reference now to FIG. 2, there is illustrated a block diagram of one embodiment of an electronic environment management system in accordance with the method, system and program of the present invention. As depicted, computer system 10 communicates with multiple diverse electronic environment measurement devices 60a–60n via a communications medium (or across a communication interface). In addition, computer system 10 communications with multiple diverse environment control systems 56a–56n via a communications medium. Moreover, computer system 10 communicates with a remote server system 38 via a communications medium.

Furthermore, computer system 10 communicates with an account server system 40 via a communication medium. The communications medium may include wired or wireless communications or other communications media that enables transmission of data. Moreover, the communications medium may include a network, such as the Internet, or a direct data link.

In a wired embodiment of the communications medium, for example, electronic environment measurement devices 60a–60n and environment control systems devices 56a–56n are connected to computer system 10 via a wired connection to parallel, serial, USB ports, or the communications adapter depicted in FIG. 1. In a wireless embodiment of the communications medium, for example, electronic environment measurement devices 60a–60n and environment control systems 56a–56n are wirelessly connected to computer system 10 via infrared, radio frequency (RF), cellular and other wireless transmissions which are preferably detected by computer system 10.

Data exchange across the communications medium is advantageously performed in at least one of multiple available data transmission protocols and is preferably supported by a common data structure format, such as the extensible mark-up language (XML) data structure format. Data transmission protocols may include, but are not limited to, Transmission Control Protocol (TCP), Internet Protocol (IP), Hypertext Transfer Protocol (HTTP), and Bluetooth. In addition, data may be transmitted in a secure manner via encryption or by technologies, such as secure socket layer (SSL) or virtual private networks (VPN).

An example of an XML data file, as depicted below, preferably contains data that is distinguished by larger element. The XML data file is intended as an example of elements and data that could be included in an XML data file transmitted from an electronic environmental measurement device that measures pollen in the air. For example, the data attributed to element "<TimeStamp> </TimeStamp>" designates the time in seconds since the Epoch, 00:00:00 Jan 1, 1970 UTC that the pollen count was recorded.

<POLLENCOUNT TimeStamp="888965153" TimeRange="888965153,888965158" LatLon="36.58, −121.85" Elevation="77" MachineID="123456" LocationName="MONTEREY PENINSULA DeviceType="Pollen Meter" IPAddress="192.168.1.1" PollenCount="7766">

A second example of the same data in an alternate XML data format that includes elements is illustrated below.

<TimeStamp>888965153</TimeStamp>
<TimeRange>888965153,888965158</TimeRange>
<LatLon>36.58, −121.85</LatLon>
<Elevation>77</Elevation>
<MachineID>123456</MachineID>
<LocationName>MONTEREY PENINSULA</LocationName>
<DeviceType>Pollen Meter</DeviceType>
<IPAddress>192.168.1.1</IPAddress>
<PollenCount>7766<PollenCount>

In the examples, an electronic pollen meter takes pollen readings at a particular latitude/longitude of 36.58/−121.85 where numbers are positive for Northern latitudes and Eastern longitudes. In addition, the elevation in meters above sea level and the time taken are included. Moreover, a machine identifier, name of the location, and Internet Protocol (IP) address are included for further specifying the pollen count taken.

In the example of the XML data format as the common transmittable data structure format, a data validation file such as a document type definition (DTD) or schema is preferably utilized to validate XML data files. In addition, a schema preferably translates multiple XML data files. Moreover, a style sheet such as an extensible stylesheet language (XSL) file is preferably utilized to provide a style specification for the XML data at the receiving system. In particular, DTDs, schemas, and XSL files may be, for example, transmitted with an XML data file to a receiving system or downloaded at the receiving system from an alternate source.

In the present examples, the DTD or schema would verify that all the data required for an environmental measurement is included in the XML data file. In addition, in the present examples, the XSL file would determine the output capabilities of the receiving system and accordingly filter the presentation of the XML data at the receiving system. For example, the XSL file may translate the XML data into a browser display where the colors, fonts, and sizes of the data are determined by the XSL file.

Environment measurement devices 60a–60n preferably include multiple diverse environment measurement devices, such as a smoke detector, carbon dioxide monitor, humidity monitor, and other monitoring devices that monitor at least one aspect of a controlled environment. Each of environment measurement devices 60a–60n preferably includes an environment indicator calculator 62a–62n. Environment indicator calculators 62a–62n preferably compute a numerical environment indicator of environmental data measured by environment measurement devices 60a–60n for an environment. In particular, in computing numerical environment indicators, the computed numbers are preferably associated with a scale of measurement that has been assigned to that type of environmental measurement. For example, wind speed is preferably measured in knots or miles/hour.

Environment indicators computed by environment indicator calculators 62a–62n are preferably converted into a common transmittable data format by transmittable converters 61a–61n, such as XML, and transmitted via the communications medium to computer system 10. While in the present embodiment transmittable converters are depicted as internally accessible to environmental measurement devices 60a–60n, in alternate embodiments transmittable converters 61a–61n may be remotely accessible to environmental measurement devices 60a–60n at, for example, an alternate data translation server.

It is important to note that environment measurement devices 60a–60n may broadcast environment indicators in the transmittable data format to any device or may selectively transmit the environment indicators to particular data processing systems. In addition, it is important to note that the location of environment measurement devices 60a–60n may be determined by the position from which environment measurement devices 60a–60n broadcast or selectively transmit environment indicators. Or alternatively, environment measurement devices 60a–60n may each be equipped with a global positioning system (GPS) that passively detects a location and transmits that location with the environment indicators.

Account server system 40 advantageously includes a universal communications identifier (UCID) lookup database 39 that includes a directory for accessing multiple UCID accounts. Advantageously, the listings for multiple UCID accounts that are stored in UCID lookup database 39 point to the location accessible via a universally accessible server system that the data for the UCID account is stored and may include other data about the UCID account, such as the owner of the account, passwords for access to the account, etc. Account server 40 may include a single server system or multiple server systems that provide universal access to the listings of UCID accounts.

The universally accessible servers system may include multiple remote servers, such as remote server system 38 that each access multiple data storage mediums, such as data storage medium 41. Remote servers may also include home computer systems, data storage provider server, web applications servers (WABs), portable computers, and mainframes. In general, the data processing systems which include the universally accessible servers system preferably provide processing power for remotely executing applications and functions according to a UCID account. In addition, data stored according to a UCID account may be repurposed at an alternate server system that formats and converts the data into the common transmittable data format in transmittal from the universally accessible servers system to computer system 10. Moreover, the data stored according to a UCID account is advantageously accessible to computer system 10 via a live network connection, however may also be replicated locally on in a temporary storage medium 37 of computer system 10.

As will be further described, a UCID account may be owned by an individual, group of individuals, a business, a government, etc. In addition, a single UCID account may be associated with multiple types of data formats and organizations of data including, but not limited to, web pages, databases, and data files. Moreover, a single UCID account may utilize multiple alphanumeric identifiers for accessing multiple levels of an account. For example, a business UCID account may include an identifier, such as a web page address, that when requested allows any user to access the web page that includes a directory of environmental identifiers measured by environmental measurement devices operated by the business. In addition, the business UCID account may include an identifier, such as a login name and password that when entered provide restricted access to a database containing specialized environmental indicators that require payment to access. In another example, an individual may control operation of an environmental measurement device for a particular environment and store environmental indicators for the particular measured environment in a database associated with the user's UCID account that is accessible via an alphanumeric identifier, where the user sells the alphanumeric identifier to people or agencies that want to monitor the environmental indicators monitored by the individual.

Multiple interfaces may be utilized for entering a UCID or multiple UCIDs in order to lookup and access a UCID account. For example, computer system 10 may include an input interface 54 at which a user can enter a UCID or multiple UCIDs and access key(s). Input interface 54 may include input devices including, but not limited to, a keyboard, a mouse, a stylus, a vocal recognition system, or a biometric detection device such as a fingerprint scanner or retina scanner. Alternatively, computer system 10 may be coupled with a device that detects a personal storage device when a user enters an environment, such as a smart card, that includes a UCID or multiple UCIDs with access key(s). In addition, a UCID or UCIDs may be received via a wireless communication medium from an alternate data storage medium or data processing system.

Multiple types of data may be associated with each UCID account accessible via account lookup server system 40. In the present example, a UCID account includes the data stored in data storage medium 41. By entering the UCID for the UCID account at computer system 10, computer system 10 transmits the UCID to account lookup server system 40 that then points to data storage medium 41, accessible via remote server system 38. In the present example, data storage medium 41 includes an environment indicator analyzer 42, an environment account 43, an environment indicator storage 44, an environment indicator reference 46, an environment profile 48, a measurement scheduler 50, and an environment controller 52. In particular, environment account 43, environment indicator storage 44, environment indicator reference 46, environment profile 48, measurement scheduler 50, and other transmittable data stored in UCID database 40 are preferably efficiently stored in a common data transmission data format such as XML.

Environment indicator analyzer 42 is advantageously an application that is executable on remote server system 38. However, environment indicator analyzer 42 may also be transmitted to a temporary storage medium 37 and executed on computer system 10. As will be further described, environment indicator analyzer 42 is enabled to analyze multiple diverse environment indicator measurements received from multiple diverse environment measurement devices 60a–60n. In addition, environment indicator analyzer 42 is preferably enabled to perform a variety of analysis including, but not limited to, a comprehensive overview of the environment according to all the environment indicators received, an overview of the environment according to environment indicators received over a particular period of time, and an overview of the environment according to the environment measurement device utilized.

Environment indicators transmitted from environment measurement devices 60a–60n to computer system 10 are preferably stored in temporary storage medium 37 prior to transmittal to environment indicator storage 44 via remote server system 38 in association with the UCID account. In an alternate embodiment, environment indicators may be transmitted from environment measurement devices 60a–60n directly to environment indicator storage 44 in association with the UCID account. Environment indicator storage 44 preferably utilizes a data storage structure for storing environment indicators according to, for example, date and time taken and the type of environment measurement device received from. Each environment indicator received at UCID account 41 is preferably analyzed by environment indicator analyzer 42 to provide the user with an analysis of the most recently received environment indicator and update an analysis of a portion of the environment.

In addition to receiving environment indicators from environment measurement devices 60a–60n, a user may input environment indicators into computer system 10 that are transmitted to the UCID account via an input interface 54 including, but not limited to, a keyboard, a mouse, a stylus, and a vocal recognition system. For example, a user may measure a water level with a ruler and enter the measurement into computer system 10 rather than utilizing an electronic environment measurement device that detects and computes a water level. In addition, a user may input environment indicators into computer system 10 that are detected and computed by an environment measurement device that is not enabled to transmit environment indicators. Measurements entered by a user via input interface 54 are preferably automatically stored in environmental indicator storage 44 of data storage medium 41.

Environment profile 48 includes environmental sensitivity profiles of environment related and non-environment related data for a person, machine, animal or other object. For example, a person's birthday, height, physical disabilities, injuries, doctors' information, allergies, health restrictions and other relevant data may be provided. For machines, animals and other objects, environmental sensitivities such as temperature requirements, water requirements, and air requirements may be included. Environment indicator analyzer 42 may utilize data for a person, machine, animal or groups of people, machines and animals, in analyzing environmental indicators. For example, if several environmental measurement devices measure allergens in the air, such as molds and multiple types of pollen, the allergen measurements would be analyzed in view of a person's allergies and warnings recommended to the person if the allergen levels exceed those tolerable by the person. In another example, water depth measurements and wind measurements might be analyzed for a particular boat in view of the water depth requirement and wind endurance specified in the boat's environment profile.

In addition, environment profile 48 may include multiple types of security methods and filters designating multiple levels of overall security for data stored in association with the UCID account. For example, dependent upon whether a user is accessing the UCID account from their home computer or from a remote computer, particular data stored on data storage medium 41 in association with a UCID account may only be accessible to the home computer as designated in the security and filtering preferences. In another example, the user may indicate that certain parts of environment profile 48, such as the user's physical disabilities are to be shielded from transmittal and access unless a password is supplied. In another example, the user may indicate that only certain types of environment indicator measurements are transmittable to and/or accessible by an outside source via a network connection. As will be understood by one with ordinary skill in the art, multiple types of security methods and filters may be applied to environment account 43, environment indicator storage 44, environment indicator reference data 46, environment profile 48, and other data stored on data storage medium 41 in association with the UCID account.

Environment indicator reference 46 preferably includes reference data for each of the types of environment indicators measured by environment measurement devices 60a–60n. Data within environment indicator reference 46 can preferably be accessed in association with the UCID account at data storage medium 41 according to the environment measurement device or type of environment indicator. In addition, environment indicator analyzer 42 may utilize data provided in environment indicator reference 46 in analysis and may include or point to data in environment indicator reference 46 in analysis reports provided to the user or to a system. Data stored within environment indicator reference 46 may be downloaded and updated.

Analysis performed by environment indicator analyzer 42 is preferably output to the user via output interface 55 according to output preferences set by the user in environment profile 48. The user-designated output preferences may designate output to multiple types of peripherals accessible to computer system 10. Examples of peripherals include, but are not limited to a graphical display, an electronic paper, an audio speaker, audio headphones, a tactile detectable device, or a printer. In particular, the user may select and provide the type of output device and may upgrade the type of output device as technology advances. The output preferences may include, but are not limited to specifications such as the size, type and coloring of a font in a graphical display, the type of tactile-detectable output (e.g. Braille), the language or the metric amount displayed.

For a graphical display, the user can preferably select from and switch between multiple types of data presentations. For example, the user may select to view of chart or graph of the analyzed data. Alternatively, the user may select to view a spreadsheet representation of the analysis. As previously described, presentation of the data may include data from environment indicator reference 46 or may provide a selectable link to particular data within environment indicator reference 46. Additional types of data presentations which are not described here may also be utilized for displaying the analyzed data from environment indicator analyzer 42.

In response to analysis performed by environment indicator analyzer 42, a control signal determined by environment controller 52 may be output to environment control systems 56a–56n to request adjustment to the environment as controlled by those systems. In particular, environment controller 52 is an application that is executable on remote server system 38, however may also be transmitted to temporary storage medium 37 and executed on computer system 10. For example, in the case where a new server system is moved into a particular office and an environment profile for the new server system is stored in environment profile 48 of the UCID account of the new server system, computer system 10 would preferably access an environment monitoring device, such as a temperature sensor, that detects the temperature of the particular office. The detected temperature would be analyzed in view of the environment profile 48 from the UCID account of the new server system. If analysis determines that the new server system is expected to add a particular amount of heat to the ambient air in the office and requires a particular ambient air temperature and humidity according to environment profile 48, then environment controller 52 would determine and transmit a control signal for the air conditioning control system and humidifier controlling the ambient air temperature for the particular office. In response to receiving the control signals, the air conditioning control system and humidifier controller would adjust output accordingly to meet the environment sensitivity needs for the new server system. In particular, the control signals would preferably adjust current settings at the air conditioning control system and humidifier controller as long as the new server system is operational in the particular office.

In the same case, included in within environment profile 48 of the UCID account for the server technician are environment sensitivities for the server technician. For example, the server technician is expected to add a particular heat to the ambient temperature of the particular office while working on the new server system. Environment controller 52 would determine control signals for the air conditioning control system and humidifier controller to control the ambient air temperature of the particular office in view of the new server system and the server technician. In response to receiving the control signals, the air conditioning control system and humidifier controller would adjust output accordingly. However, when the server technician is done working, the server technician would indicate that his profile should be removed from analysis for the particular room. Thereafter, environment controller 52 would determine control signals in view of only the new server system and transmit the control signals to the air conditioning control system and humidifier controller. Alternatively, environment controller 52 may provide individual control signals for each environmental sensitivity such that when the server technician is ready to leave, environment controller 52 indicates to the air conditioning control system and humidifier control system that the control signal for the server technician can be removed from a list of elements within the particular office.

Measurement scheduler 50 provides control of preset scheduling of when particular types of environment measurements need to be taken and controls whether or not the computer system is to automatically transmit the environment indicator measurements to a particular server or data storage medium. In particular, measurement scheduler 50 is an application that is executable on remote server system 38, however may also be transmitted to temporary storage medium 37 and executed on computer system 10. The types of environment measurements which need to be taken from a portion of the environment and the time frame in which the measurements need to be taken, as indicated by a user or a predetermined measurement schedule, is preferably stored in measurement scheduler 50. Scheduling data from a predetermined measurement schedule may be downloaded into measurement scheduler 50. For example, a predetermined measurement schedule may designate that a measurement of the carbon dioxide in "Building 20" needs to be measured every 2 hours. In response to the designated schedule, in one example, as directed by measurement scheduler 50, computer system 10 may request communication with a carbon dioxide measurement device for "Building 20" every 2 hours and remotely receive an indicator measurement of the carbon dioxide levels for "Building 20". In another example, an operator may be required to control measurement taking and acquisition of the measurement.

For each scheduled measurement, measurement scheduler 50 preferably provides a reminder or series of reminders. For example, a user may be reminded at 7 AM that a measurement needs to be taken. If a measurement has not been received by 9 AM, the user may be reminded that the grace period for taking a measurement has expired. Measurement scheduler 50 may also provide a schedule to the user of when and what measurements need to be taken each day and indicate to the user when the measurement has been received. In particular, if a measurement is not received at all, or is delayed, a record of the lack of receipt or delay may be added to environment indicator storage 44. A user may access environment indicator storage 44 in order to view the measurements taken for an environment and to monitor the timeliness of the measurements received.

Environment account 43 preferably includes a account information for a user or company, such as, but not limited to, a pre-paid balance, a credit card number, or checking number. In one embodiment of the present invention, for each use of environment measurement devices 60a–60n detected at the UCID account, the environment account 43 is charged. In another example, environment account 43 may be charged for the use of an environment control system. Moreover, environment account 43 may be charged according to time utilized in processing data by remote server system 38.

Computer system 10 is advantageously a dumb terminal whereby the majority of processing is offset to remote server system 38, however computer system 10 may also be a fully functional data processing system that is portable or stationary. In addition, computer system 10 is customizable to a user's preferences. For example, a user may choose a computer system 10 with a black and white display while another user may choose a color display. Moreover, computer system 10 can be upgraded to include new features, applications, and functions without needing to upgrade environment measurement devices and environment control systems.

Moreover, a UCID account is preferably enabled to store and analyze environment indicators from environment measurement devices 60a–60n in multiple environments, such that a single UCID account can monitor and analyze environment indicators in multiple diverse environments. In addition, it is important to note that a single UCID account is preferably enabled to control multiple environment control systems 56a–56n in multiple diverse environments via multiple computer systems, such that the environment in multiple diverse environments is controllable via the UCID account. Furthermore, it is important to note that a UCID account may be accessed by a particular user, or may be accessed a particular user on behalf of a machine, animal, or other object.

In another aspect of the present invention, it is important to note that computer system 10 may temporarily determine and transmit control signals to environment control systems 56a–56n as directed by a UCID account while a user is located within a particular environment, however environment control systems 56a–56n preferably retain control signals received from computer system 10 that indicate environment sensitivities of users. Therefore, once the environment control systems 56a–56n have received a control signal for users, access to a UCID account via computer system 10 is not necessary unless further monitoring of the environment is required.

Moreover, for a particular UCID account, multiple UCIDs and/or passwords may be entered to access the account. For example, if a user A has a UCID account, user A might access the UCID account by entering a UCID with a password of "Apple" and receive full access to the UCID account. However, user A's employer might access a filtered portion of user A's UCID account by entering the UCID with a password of "Banana". By another method, remote server system 38 may detect a user id for a person attempting to access a particular UCID account and limit access according to user id's designated by the UCID account owner at the UCID. Therefore, the owner of a particular UCID account can preferably provide variable limits of accessibility to the UCID account according to the UCID utilized to access the account.

Figure 3:
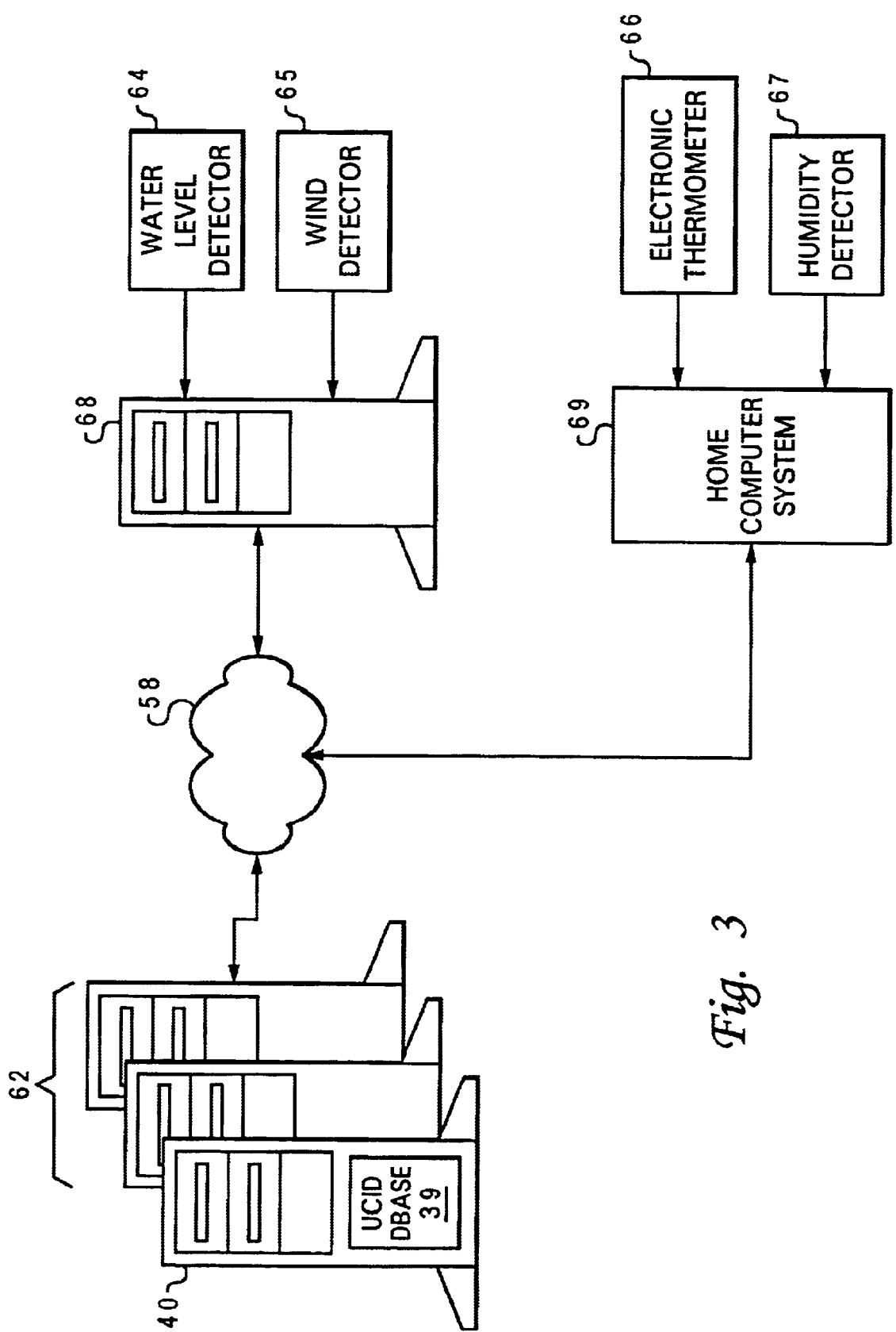
FIG. 3 depicts a block diagram of one embodiment of a configuration of an environment management system in accordance with the method, system and program of the present invention.

With reference now to FIG. 3, there is depicted a block diagram of a configuration of an environment management system in accordance with the method, system and program of the present invention. As depicted, multiple universally accessible server systems 62 and account server system 40 are accessible via a network connections, such as network 58, which includes, for example, the Internet. Multiple UCID account may be accessible at data storage mediums accessible via universally accessible server systems 62.

In the example depicted, server 68 and home computer system 69 each receive environment indicators from multiple environment measurement devices. For example, server 68 receives environment indicators from water level detector 64 and wind detector 65 for a particular zone of the environment. In addition, home computer system 69 receives environment indicators from electronic thermometer 66 and humidity detector 67 for a particular zone of the environment. The environment indicators received from measurement devices 64, 65, 66 and 67 may be transmitted via a wireless communication medium or a wired communication medium. In one example, the water level and wind detection from server 68 may be stored at a UCID account for the environment from which the measurements are taken. A user might subscribe to the UCID account to access current weather conditions at, for example, a lake where the measurements are taken.

Referring now to FIG. 4, there is depicted a block diagram of a data storage structure for the environment indicator storage in accordance with the method, system and program of the present invention. As depicted, a data storage structure 70 includes multiple categorized entries. Environmental indicators and other data from multiple types of environmental measurement devices may be stored in data storage structure 70 as translated a data file in the common transmittable data format, such as the XML data format. While one type of data storage structure is depicted, in alternate embodiments, alternate types of data storage structures may be utilized. Moreover, while particular categories are designated and depicted in data storage structure 70, additional and alternate categories may be designated and depicted in data storage structure 70 in alternate embodiments of the present invention.

A first category indicated at reference numeral 72 includes environment indicator measurements. Next, a second category indicated at reference numeral 74 designates the date and time that the indicator measurement was taken. Thereafter, a third category indicated at reference numeral 76 includes the measurement unit. Moreover, a category depicted at reference numeral 77 designates the environment zone from which the measurement was received. In the example provided, multiple entries are provided in each category as depicted at reference numeral 78. For example, on "11/20/2000" at "06:10:20" a second-hand smoke reading was received where 30 particles/cubic inch were detected in "Building 30". Later, on "11/13/2000" at "07:15:12" a s second-hand smoke reading was received where 200 particles/cubic inch were detected in "Building 30".

With reference now to FIG. 5, there is illustrated a block diagram of a data storage structure for the measurement scheduler in accordance with the method, system and program of the present invention. As depicted, a data storage structure 80 includes multiple categorized entries. Measurement scheduling for multiple types of environmental measurement devices may be stored in data storage structure 80 as translated a data file in the common transmittable data format, such as the XML data format. While one type of data storage structure is illustrated, in alternate embodiments, alternate types of data storage structures may be utilized. In addition, while particular categories are designated and depicted in data storage structure 80, additional and alternate categories may be designated and depicted in data storage structure 80 in alternate embodiments of the present invention.

A first category depicted at reference numeral 82 includes the type of measurement to take. Next, a second category illustrated at reference numeral 84 designates the date and time to take the measurement. Thereafter, a third category depicted at reference numeral 86 includes the range of time. Moreover, a fourth category illustrated at reference numeral 87 designates a server destination for automatic transmissions. Next, a fifth category depicted at reference numeral 89 includes the environmental zone from which the measurement. Information may be included with the environmental zone that provides for remotely accessing a device in the environmental zone. In the example provided, multiple entries are provided in each category as depicted at reference numeral 88. For example, carbon monoxide readings are scheduled to be taken on "11/18/2000" from "Lake X" between at "10:00:00" with a range of "00:05:00" flexibility in receiving the measurement. When the carbon monoxide indicator is received, the measurement is to be automatically transmitted to "Server A".

Referring now to FIG. 6, there is depicted a block diagram of a data storage structure for environment profiles in accordance with the method, system and program of the present embodiment. As illustrated a data storage structure 90 includes multiple categorized entries. Environment profiles for multiple users and environmentally sensitive devices may be stored in data storage structure 90. While one type of data storage structure is illustrated, in alternate embodiments, alternate types of data storage structures may be utilized. Moreover, while particular categories are designated and depicted in data storage structure 90, additional and alternate categories may be designated and depicted in data storage structure 90 in alternate embodiments of the present invention.

A first category depicted at reference numeral 92 includes the UCID. Next, a second category illustrated at reference numeral 93 designates the password for the UCID. Although not depicted, multiple passwords and/or filters may be placed on a UCID account by the user where a particular password designates the amount of access to a particular UCID account.

A third category depicted at reference numeral 94 includes multiple additional categories such as birth date, allergies, etc. Next, a fourth category illustrated at reference numeral 95 includes health restrictions and a fifth category depicted at reference numeral 96 includes output preferences. Alternatively, a category illustrated at reference numeral 97 includes environmentally sensitive devices, a category depicted at reference numeral 98 includes environmental sensitivities of the environmentally sensitive devices and a category illustrated at reference numeral 99 includes the environmental zones where the environmentally sensitive devices are located. In analysis of environmental indicators, a selection of users and environmentally sensitive devices may be incorporated where the selection of users and environmentally sensitive devices are within a designated portion of the environment.

In the example depicted, a person with a UserID "GeorgeG" has a health restriction of not being in an environment where smoke levels are greater than 30 30 particles/cubic inch because of a health condition. Therefore, if smoke level in an environment where GeorgeG is currently or is planning on going is greater than 30 particles/cubic inch, then GeorgeG is preferably alerted upon analysis of the smoke level indicator measurement received at the computer system. In addition, particular instructions may be provided in response to the analysis if the smoke level indicator measurement is greater than 30 particles/cubic inch. Moreover, if an environment control system, such as an air conditioning/ventilation system, is available which can adjust the environment to reduce the smoke levels, the computer system preferably transmits a control signal to that control system requesting an adjustment to the environment.

The user profile for "GeorgeG" is easily transmittable in an XML data file as illustrated below where the machine ID and location of portable computer system 10 in latitude, longitude and elevation, as detected by a GPS, is included with the environmental sensitivity profile.

<TimeStamp>888965153</TimeStamp>
<LatLon>36.58, −121.85</LatLon>
<Elevation>77</Elevation>
<MachineID>123456</MachineID>
<UserID>GeorgeG</UserID>
<SmokeMax>30</SmokeMax>

Figure 7:
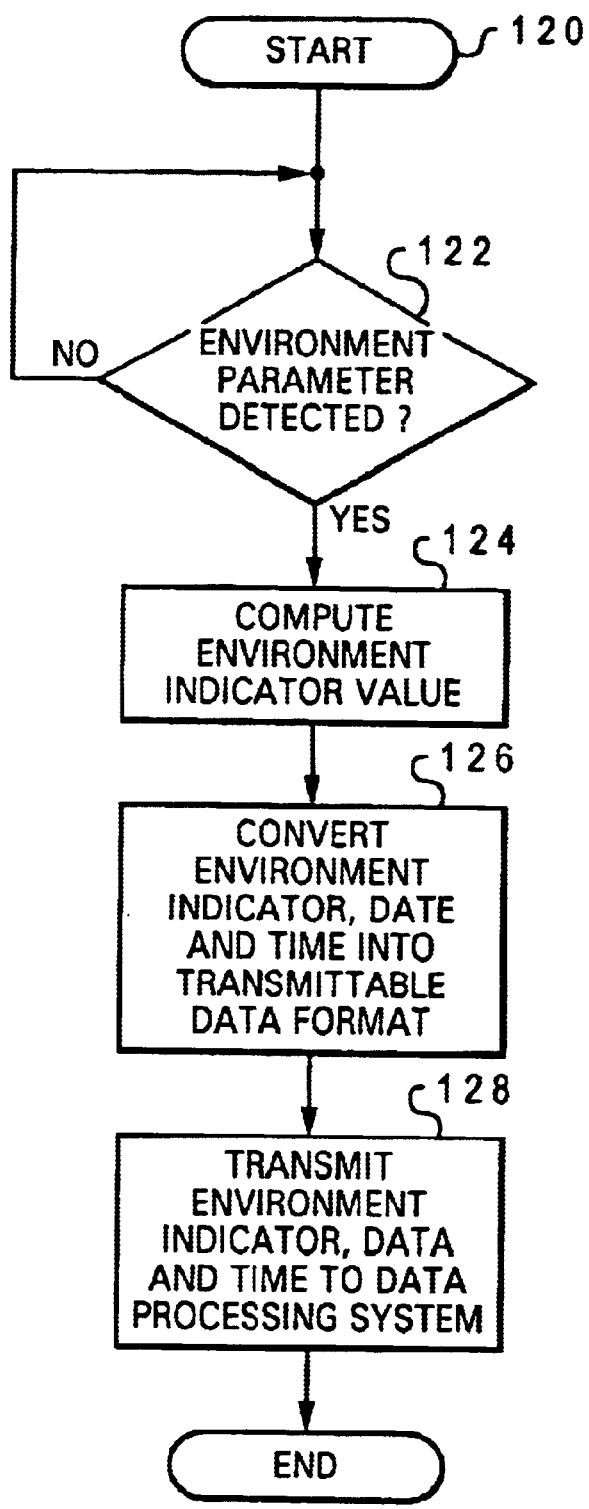
FIG. 7 depicts a high level logic flowchart of a process and program for transmitting environment indicators to a personal environment indicator monitoring system in accordance with the method, system and program of the present invention.

With reference now to FIG. 7, there is illustrated a high level logic flowchart of a process and program for transmitting environment indicators to a personal environment indicator monitoring system in accordance with the method, system and program of the present invention. As depicted, the process starts at block 120 and thereafter proceeds to block 122. Block 122 illustrates a determination as to whether or not a environment parameter is detected. Each environment measurement device will detect different types of environment parameters. For example, a water level device will detect a water level for a particular body of water, while a smoke detector will detect a smoke level in a particular enclosed area. If an environment parameter is not detected, the process iterates at block 122. If a environment parameter is detected, the process passes to block 124. Block 124 depicts computing a environment indicator value. Thereafter, block 126 illustrates converting the environment indicator and date and time of receipt into a common transmittable data format. Next, block 128 depicts transmitting the environment indicator and data and time of receipt to a personal environment monitor and the process ends.

Figure 8:
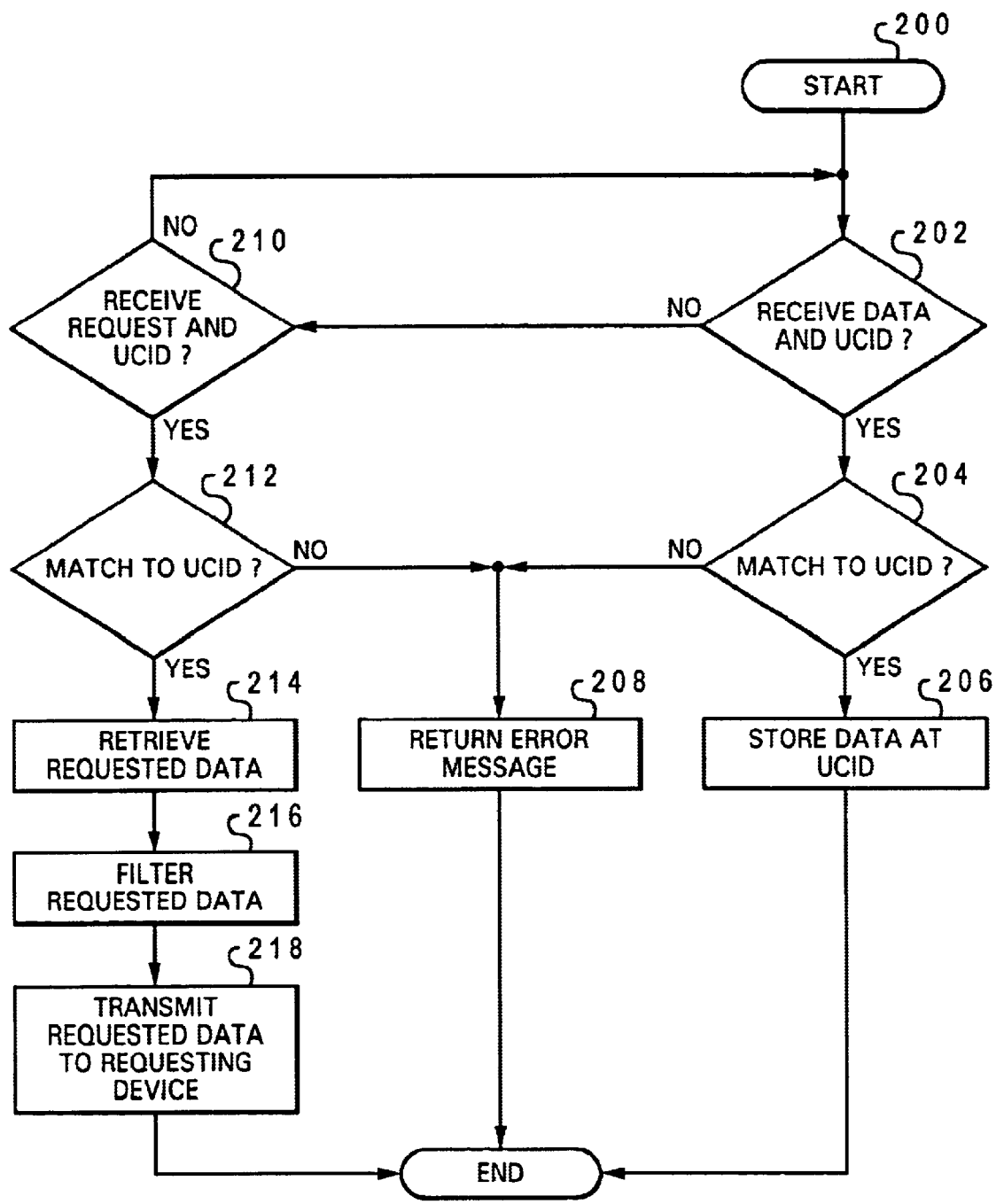
FIG. 8 illustrates a high level logic flowchart of a process and program for controlling data flow in a universally accessible database in accordance with the method, system and program of the present invention.

Referring now to FIG. 8, there is illustrated a high level logic flowchart of a process and program for accessing a UCID account in accordance with the method, system, and program of the present invention. As depicted, the process starts at block 200 and thereafter proceeds to block 202. Block 202 illustrates a determination as to whether or not data and a UCID are received at the account server system. The UCID may or may not require a password. If data and a UCID are not received, then the process passes to block 219. If data and a UCID are received, then the process passes to block 204. Block 204 depicts a determination as to whether or not a match to the UCID is found. A match to the UCID account may require a match to the UCID and a password in the UCID lookup database. If a match to the UCID is not found, then the process passes to block 208. Block 208 illustrates returning an error message to the providing device and the process ends. If a match to the UCID is found, then the process passes to block 206. Block 206 depicts storing the data at a data storage medium accessed according to the UCID account and the process ends.

Block 210 depicts a determination as to whether or not a request and UCID are received. If a request and UCID are not received, then the process passes to block 202. If a request and UCID are received, then the process passes to block 212. Block 212 illustrates a determination as to whether or not a match to the UCID is found in the UCID lookup database. If a match is not found, then the process passes to block 208. If a match is found, then the process passes to block 214. Block 214 depicts retrieving the requested data from the data storage medium accessed via the UCID account. Next, block 216 illustrates filtering the requested data according to filtering preferences at the UCID account. Thereafter, block 218 depicts transmitting the requested data to the requesting device and the process ends.

Figure 9:
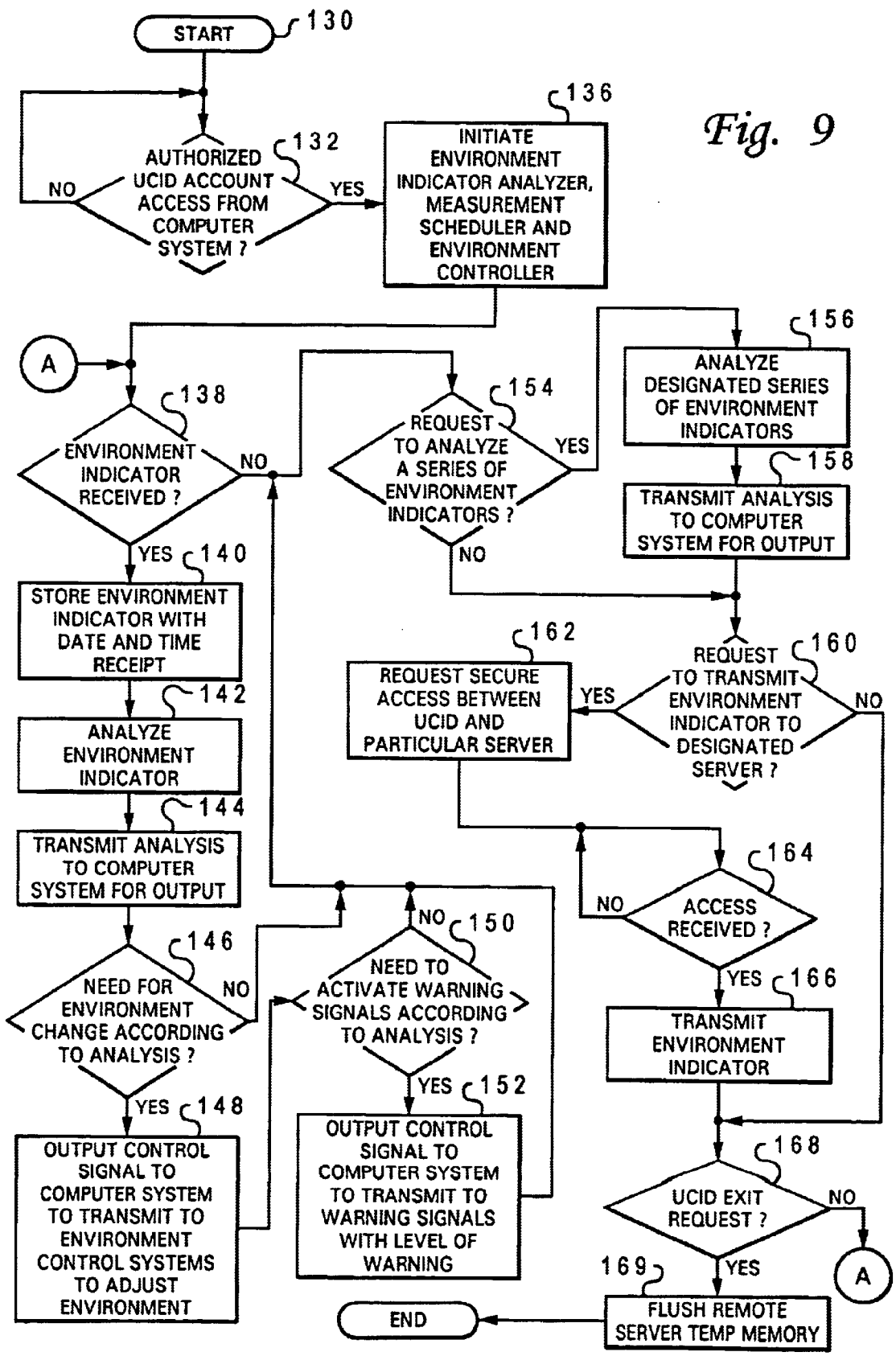
FIG. 9 depicts a high level logic flowchart of a process and program for processing environment indicators received at a personal environment monitor in accordance with the method, system and program of the present invention.

With reference now to FIG. 9, there is depicted a high level logic flowchart of a process and program for processing environment indicators received at a UCID account in accordance with the method, system and program of the present invention. As illustrated, the process starts at block 130 and thereafter proceeds to block 132. Block 132 depicts a determination as to whether or not an authorized UCID account access is allowed from a computer system. If an authorized UCID account access is not allowed, then the process iterates at block 132. If an authorized UCID account access is allowed, then the process passes to block 136. Block 136 illustrates initiating the environment indicator analyzer, measurement scheduler and environment controller for the verified UCID account and the process passes to block 138.

Block 138 depicts a determination as to whether or not an environment indicator is received. If an environment indicator is not received, the process passes to block 154. If an environment indicator is received, the process passes to block 140. Block 140 illustrates storing the environment indicator with data and time receipt at UCID account. Thereafter, block 142 depicts analyzing the received environment indicator. In particular, in analyzing the received environment indicator, past analysis and current environment profiles are utilized. Next, block 144 illustrates transmitting the analysis to a computer system for output. In general, the computer system may be a dumb terminal, a server or other data processing system with an output interface. In particular, the output interface which may include multiple types of output devices such as display monitors, audio speakers, tactile-detectable devices, etc. In addition, the analysis is preferably displayed according to any user output preferences stored in the environment profile.

Block 146 depicts a determination as to whether or not there is a need for an environmental change according to the analysis. For example, if humidity levels are detected at 50% and for a particular machine for which humidity levels should remain less than 50%, a need for adjustment to the environment would be detected during analysis. If there is not a need for an environmental change, the process passes to block 154. If there is a need for an environmental change, the process passes to block 148. Block 148 illustrates requesting to determine a control signal for environmental control systems to adjust the environment. In the example of the humidity levels, a control signal would be requested to be determined by the UCID account for requesting a dehumidifier to decrease the humidity levels. Thereafter, block 150 depicts a determination as to whether or not there is a need to activate warning signals according to the analysis. If there is not a need to activate warning signals, the process passes to block 154. If there is a need to activate warning signals, the process passes to block 152. Block 152 illustrates requesting to determine a control signal for warning signals, such as an alarm, with the level of warning and the process passes to block 154.

Block 154 depicts a determination as to whether or not a request to analyze a series of environment indicators is received. In particular a request may be made to analyze a series of environment indicators according to a time period, date, indicator type, etc as designated by the user. If a request to analyze a series of environment indicators is not made, the process passes to block 160. If a request to analyze a series of environment indicators is made, the process passes to block 156. Block 156 illustrates analyzing the designated series of environment indicators according to indicated criteria. Thereafter, block 158 depicts displaying the analysis and the process passes to block 160.

Block 160 depicts a determination as to whether or not a request to transmit an environment indicator(s) to a designated server is made. If a request to transmit an environment indicator is not made, the process passes to block 168. If a request to transmit a environment indicator is made, the process passes to block 162. Block 162 illustrates requesting secure access between the remote server system housing the UCID account data and the designated server. Next, block 164 depicts a determination as to whether or not secure access is received. If secure access is not received, the process iterates for a particular time at block 164. If secure access is received, the process passes to block 166. Block 166 illustrates transmitting the environment indicator(s) and the process passes to block 168.

Block 168 depicts a determination as to whether or not a UCID exit request has been received. In one example, a user may log out of a particular UCID account as a UCID exit request. If a UCID exit request has not been received, then the process passes to block 138. If a UCID exit request has been received, then the process passes to block 169. Block 169 illustrates flushing the temporary memory of the remote server system of data relating to the UCID account and the process ends. In addition, any data stored in the temporary memory of a computer system accessing the UCID account is preferably flushed.

Figure 10:
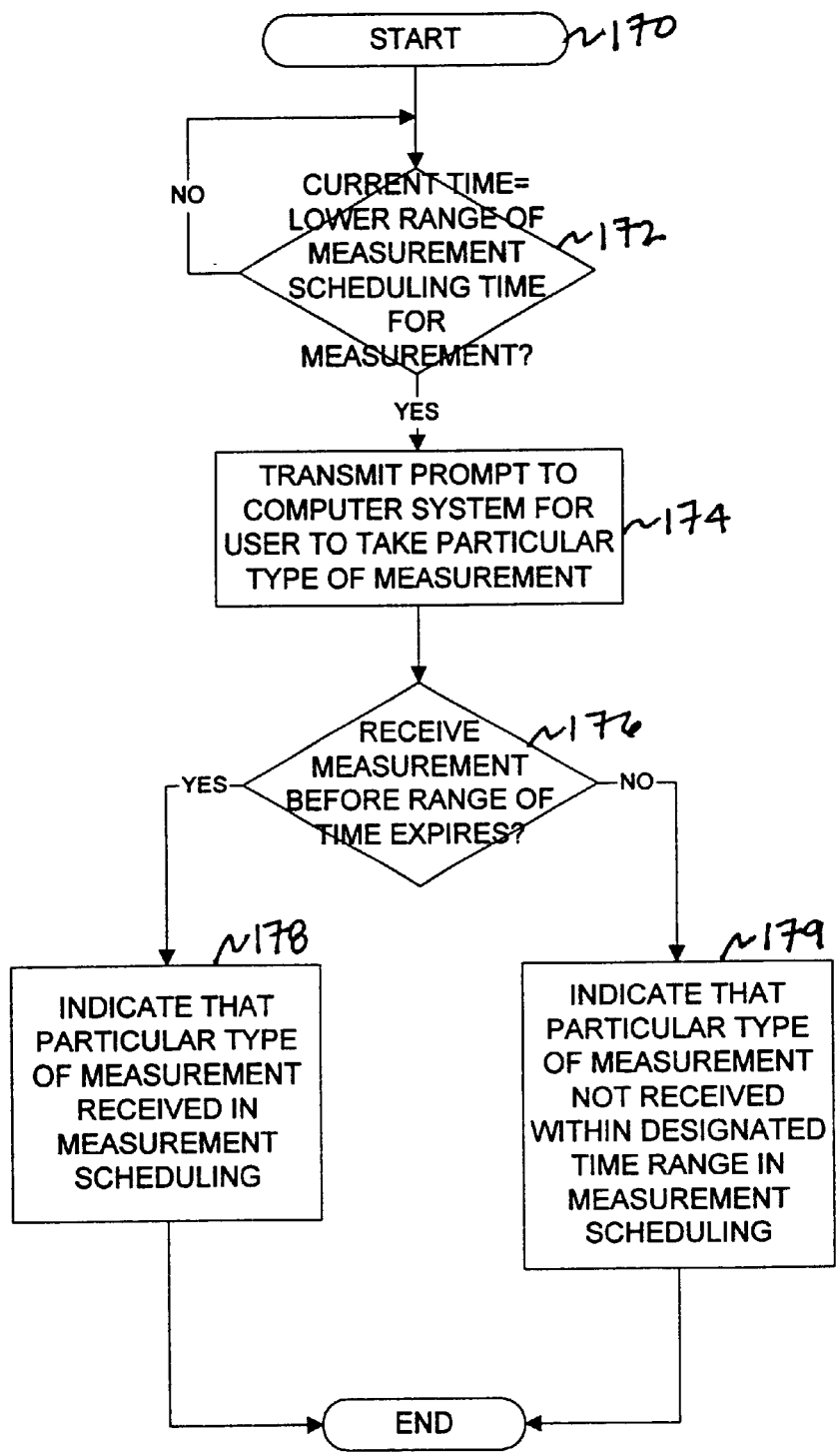
FIG. 10 illustrates a high level logic flowchart of a process and program for monitoring receipt of environment indicators in accordance with the method, system and program of the present invention.

Referring now to FIG. 10, there is illustrated a high level logic flowchart of a process and program for monitoring receipt of environment indicators in accordance with the method, system and program of the present invention. As depicted, the process start at block 170 and thereafter proceeds to block 172. Block 172 illustrates a determination as to whether or not the current time is equal to the lower range of a measurement scheduling time. If the current time is not equal to the lower range of a measurement scheduling time, the process iterates at block 172. If the current time is equal to the lower range of a measurement scheduling time, the process passes to block 174. Block 174 depicts prompting the user to take a particular type of measurement or the computer system to request access to a particular type of measurement according to the measurement type scheduled for the measurement scheduling time. Thereafter, block 176 illustrates a determination as to whether or not the environment indicator measurement is received before the range of time scheduled for the measurement expires. If the measurement is received before the range of time expires, the process passes to block 178. Block 178 depicts indicating that the particular type of measurement is received in the measurement scheduling record and the process ends. If the measurement is not received before the range of time scheduled for the measurement expires, the process passes to block 179. Block 179 illustrates indicating that the particular type of measurement was not received within the designated range of time in the measurement scheduling record and the process ends.

Figure 11:
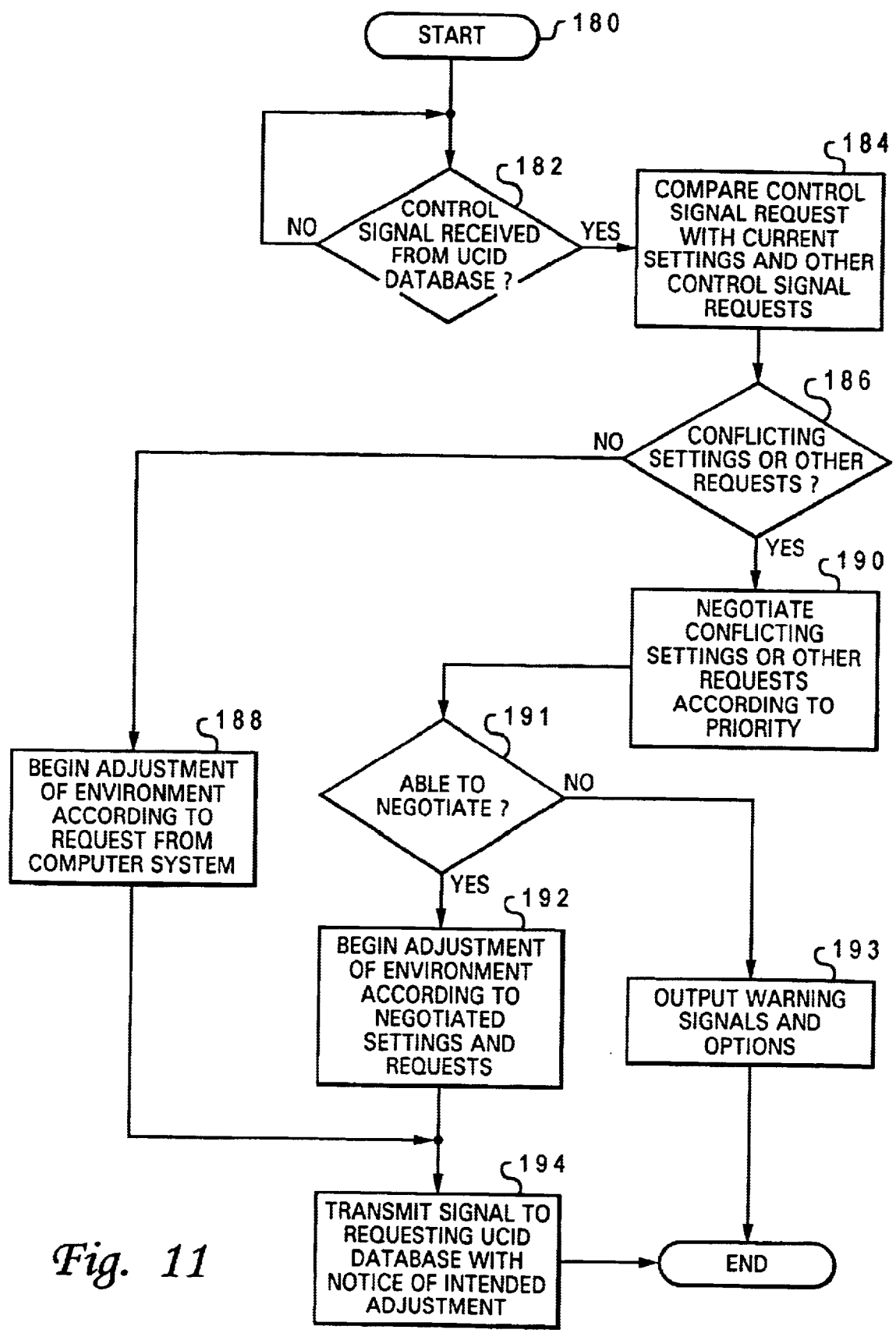
FIG. 11 depicts a high level logic flowchart of a process and program for adjusting a controlled environment in accordance with the method, system and program of the present invention

With reference now to FIG. 11, there is depicted a high level logic flowchart of a process and program for adjusting a controlled environment in accordance with the method, system and program of the present invention. As illustrated, the process starts at block 180 and thereafter proceeds to block 182. Block 182 depicts a determination as to whether or not a control signal is received from UCID database account. If a control signal is not received from a UCID database account, then the process iterates at block 182. If a control signal is received from a computer system, then the process passes to block 184. Block 184 illustrates comparing the control signal request with current settings and other control signal requests. Other control signal requests may be received at the environment control system from alternate computer systems and/or UCID accounts. Thereafter, block 186 depicts a determination as to whether or not there are conflicting settings or other requests. If there are not conflicting settings or other requests, then the process passes to block 188.

Block 188 illustrates beginning the adjustment of the environment according to the request from the UCID account and the process passes to block 194. If there is a conflicting setting or other request, then the process passes to block 190. Block 190 depicts negotiating the conflicting settings or other requests according to priority and the process passes to block 191. For example, settings for the environmental control system may be given a priority where only requests from a particular UCID account will override the settings. In an alternate example, settings for the environmental control system may include a default that is utilized when there are not requests from UCID accounts. In the case where there are requests from other UCID accounts and computer systems, priority may be given according to an ordering scheme, such as adjusting the environment in order of the received request. Block 191 depicts a determination as to whether or not the control system was able to negotiate between conflicting requests. If the control system is not able to negotiate between conflicting requests, then the process passes to block 193. Block 193 illustrates outputting warnings signals and options to the UCID account and the process ends if the control system is able to negotiate between conflicting requests, then the process passes to block 192. Block 192 illustrates beginning adjustment of the environment according to the negotiated settings and requests. Thereafter, block 194 depicts transmitting a signal to the requesting UCID account with notice of intended adjustment and the process ends.

It is important to note that, although the present invention has been described in the context of a fully functional computer system, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal-bearing media include, but are not limited to, recordable-type media such as floppy disks or CD-ROMs and transmission-type media such as analogue or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for managing an environment, said method comprising the steps of:
    converting a plurality of environment indicators computed for a particular environment from among a plural of environments into a common transmittable data format, wherein each of said plurality of environment indicators is computed by an electronic environment measurement device from among a plurality of diverse electronic environment measurement devices;
    transmitting said plurality of environment indicators in said common transmittable data format to a universally accessible server system in association with a particular universal identifier, wherein said particular universal identifier is associated with a particular user;
    analyzing said plurality of environment indicators received at said universally accessible server system according to an environment sensitivity profile stored within said universally accessible server system in association with said particular universal identifier;
    determining a plurality of control signals at said universally accessible server system for adjusting a plurality of environment control systems that control said particular environment, in response to said analyzing of said plurality of environment indicators according to said environment sensitivity profile; and adjusting said particular environment as controlled by said plurality of environment control systems according to said plurality of control signals, such that a particular environment is temporarily managed via a universally accessible server system according to an environment sensitivity profile associated with a particular user.

2. The method for managing an environment according to claim 1, said method further comprising the step of:

outputting results from said analysis of said plurality of environment indicators by said universally accessible server system to an output interface controlled by a data processing system with access to said universally accessible server system.

3. The method for managing an environment according to claim 1, said step of transmitting said plurality of environment indicators further comprising the step of:

transmitting said plurality of environment Indicators to a particular remote server system from among the plurality of remote server system of said universally accessible server system.

4. The method for managing an environment according to claim 1, said method further comprising the step of:

downloading data to said universally accessible server system according to said particular universal identifier, wherein said downloaded data is utilized for said analysis of said plurality of environment indicators.

5. The method for managing an environment according to claim 1, said step of analyzing said plurality of environment indicators further comprising the step of:

analyzing a user-designated selection of environment indicators from among said plurality of environment indicators transmitted to said universally accessible server system according to said universal identifier.

6. The method for managing an environment according to claim 1, said step of analyzing said plurality of environment indicators further comprising the step of:

analyzing said plurality of environment indicators according to an environment profile stored at said universally accessible server system according to said universal identifier, wherein said environment profile comprises environmental sensitivities for a plurality of users located within said particular environment.

7. The method for managing an environment according to claim 1, said step of analyzing said plurality of environment indicators further comprising the step of:

analyzing said plurality of physical environment indicators according to an environment indicator reference stored at said universally accessible server system according to said universal identifier.

8. The method for managing an environment according to claim 1, said method further comprising the step of:

storing said plurality of control signals at said plurality of environment control systems such that said plurality of environment control systems adjust said particular environment according to environment sensitivity profiles of users located within said particular environment independent of said universally accessible server system supplying said control signals.

9. The method for managing an environment according to claim 1, said method further comprising the steps of:

receiving a universal Identifier for said particular user with a request for data; and accessing said requested data from said universally accessible server system in association with said universal identifier for said particular user, in response to verifying said universal identifier at a universally accessible lookup database.

10. The method for managing an environment according to claim 9, said method further comprising the step of:

comparing said universal identifier with a plurality of universal identifiers at said universally accessible lookup database, wherein said universally accessible lookup database points to system addresses in association with said plurality of universal identifiers.

11. The method for managing an environment according to claim 1, said method further comprising the step of:

receiving a universal identifier for said particular user at said universally accessible server system via a wireless detection of said universal identifier.

12. The method for managing an environment according to claim 1, said method further comprising the step of:

debiting an environment account stored at said universally accessible server system in association with said particular user.

13. A system for managing an environment, said system comprising:

means for converting a plurality of environment indicators computed for a particular environment from among a plurality of environments into a common transmittable data format, wherein each of said plurality of environment indicators is computed by an electronic environment measurement device from among a plurality of diverse electronic environment measurement devices;

means for transmitting said plurality of environment indicators in said common transmittable data format to a universally accessible server system in association with a particular universal identifier, wherein said particular universal identifier is associated with a particular user;

means for analyzing said plurality of environment indicators received at said universally accessible server system according to an environment sensitivity profile stored within said universally accessible server system in association with said particular universal identifier;

means for determining a plurality of control signals at said universally accessible server system for adjusting a plurality of environment control systems that control said particular environment, in response to said analyzing of said plurality of environment indicators according to said environment sensitivity profile; and means for adjusting said particular environment as controlled by said plurality of environment control systems according to said plurality of control signals, such that a particular environment is temporarily managed via a universally accessible server system according to an environment sensitivity profile associated with a particular user.

14. The system for managing an environment according to claim 13, said system further comprising:

means for outputting results from said analysis of said plurality of environment indicators by said universally accessible server system to an output interface controlled by a data processing system with access to said universally accessible server system.

15. The system for managing an environment according to claim 14, said means for outputting results from said analysis of said plurality of environment indicators further comprising:

means for outputting results from said analysis according to user output preferences stored at said universal accessible server system according to said particular universal identifier.

16. The system for managing an environment according to claim 13, said means for transmitting said plurality of environment indicators further comprising:

means for transmitting said plurality of environment indicators to a particular remote server system from among the plurality of remote server system of said universally accessible server system.

17. The system for managing an environment according to claim 13, said system further comprising:

means for downloading data to said universally accessible server system according to said particular universal identifier, wherein said downloaded data is utilized for said analysis of said plurality of environment indicators.

18. The system for managing an environment according to claim 13, said means for analyzing said plurality of environment indicators further comprising:

means for analyzing a user-designated selection of environment indicators from among said plurality of environment indicators transmitted to said universally accessible server system according to said particular universal identifier.

19. The system for managing an environment according to claim 13, said means for analyzing said plurality of environment indicators further comprising:

means for analyzing said plurality of environment indicators according to an environment profile stored at said universally accessible server system according to said particular universal identifier, wherein said environment profile comprises environmental sensitivities for a plurality of users.

20. The system for managing an environment according to claim 13, said means for analyzing said plurality of environment indicators further comprising:

means for analyzing said plurality of physical environment indicators according to an environment indicator reference stored at said universally accessible server system according to said universal identifier.

21. The system for managing an environment according to claim 13, said system further comprising:

means for storing said plurality of control signals at said plurality of environment control systems such that said plurality of environment control systems adjust said particular environment according to environment sensitivity profiles of users within said particular environment independent of said universally accessible server system supplying said control signals.

22. The system for managing an environment according to claim 13, said system further comprising:

means for receiving a universal identifier for said particular user with a request for data; and means for accessing said requested data from said universally accessible server system in association with said universal identifier for said particular user, in response to verifying said universal identifier at a universally accessible lookup database.

23. The system for managing an environment according to claim 22, said system further comprising:

means for comparing said universal identifier with a plurality of universal identifiers at said universally accessible lookup database wherein said universally accessible lookup database points to system addresses in association with said plurality of universal identifiers.

24. The system for managing an environment according to claim 13, said system further comprising:

means for receiving a universal identifier for said particular user at said universally accessible server system via a wireless detection of said universal identifier.

25. The system for managing an environment according to claim 13, said system further comprising:

means for debiting an environment account stored at said universally accessible server system in association with said particular user.

26. The system for managing an environment according to claim 13, wherein said universally accessible server system is housed in a plurality of remote servers.

27. The system for managing an environment according to claim 26, wherein said plurality of environment indicators are received at an account server and transmitted via a network interface to said plurality of remote servers.

28. A program residing on a computer usable medium having computer readable program code means, said program comprising:

means for receiving at a universally accessible server system in association with a particular universal identifier a plurality of environment indicators computed for a particular environment from among a plurality of environments, wherein each of said plurality of environment indicators is computed by an electronic environment measurement device from among a plurality of diverse electronic environment measurement devices, means for analyzing said plurality of environment indicators received at said universally accessible server system according to an environment sensitivity profile stored within said universally accessible server system in association with said particular universal identifier for a particular user; and means for computing a plurality of control signals at said data processing system for adjusting a plurality of environment control Systems that control said particular environment.

29. The program according to claim 28, said program further comprising:

means for storing said plurality of environment indicators at said universally accessible server system in association with said particular universal identifier.

30. The program according to claim 28, said program further comprising:

means for analyzing said plurality of environment indicators according to an environment profile stored at said universally accessible server system according to said particular universal identifier, wherein said environment profile comprises environmental sensitivities for a plurality of users located within said particular environment.

31. The program according to claim 28, said program further comprising:

means for analyzing said plurality of physical environment indicators according to an environment indicator reference stored at said universally accessible server system according to said particular identifier.

32. A method for tracking the environmental exposure of a particular user, said method comprising the steps of:

accessing at a computer system in association with a particular environment a plurality of environmental indicators computed for said particular environment by a plurality of diverse electronic environmental measurement devices and converted into a common transmittable data format; and in response to detecting a particular user within a particular proximity of said particular environment, transmitting said plurality of environmental indicators from said computer system to a universally accessible server system in association with a particular universal identifier for said particular user, such that environmental indicators for environments to which said particular user is exposed are automatically stored at said universally accessible server system in association with said particular user.

33. The method for tracking the environmental exposure of a particular user according to claim 32, said method further comprising the step of:

detecting said particular user by detecting a personal identification device physically associated with said particular user, wherein said universal identifier for said particular user is detected from said personal identification device.

34. The method for tracking the environmental exposure of a particular user according to claim 32, said method further comprising the step of:

detecting said particular user by detecting a user entry of said particular universal identifier at said computer system.

35. The method for tracking the environmental exposure of a particular user according to claim 32, said method further comprising the step of:

debiting an account associated with said particular universal identifier for each storage of said plurality of environmental indicators.

36. The method for tracking the environmental exposure of a particular user according to claim 32, said method further comprising the steps of:

filtering said plurality of environmental indicators according to a designated selection of types of environmental indicators in association with said universal identifier; and only storing said filtered selection of environmental indicators at said universally accessible server system in association with said universal identifier.

37. A system for tracking the environmental exposure of a particular user, said system comprising:

means for accessing at a computer system in association with a particular environment a plurality of environmental indicators computed for said particular environment by a plurality of diverse electronic environmental measurement devices and converted into a common transmittable data format; and means for transmitting said plurality of environmental indicators from said computer system to a universally accessible server system in association with a particular universal identifier for said particular user, in response to detecting a particular user within a particular proximity of said particular environment such that environmental indicators for environments to which said particular user is exposed are automatically stored at said universally accessible server system in association with said particular user.

38. The system for tracking the environmental exposure of a particular user according to claim 37, wherein said computer system detects a personal identification device physically associated with said particular user, wherein said personal identification device comprises said particular universal identifier.

39. The system for tracking the environmental exposure of a particular user according to claim 37, wherein said computer system detects a user entry of said universal identifier via an input interface.

40. The system for tracking the environmental exposure of a particular user according to claim 37, said system further comprising:

means for debiting an account associated with said particular universal identifier for each storage of said plurality of environmental indicators.

41. The system for tracking the environmental exposure of a particular user according to claim 37, said system further comprising:

means for filtering said plurality of environmental indicators according to a designated selection of types of environmental indicators in association with said universal identifier; and means for only storing said filtered selection of environmental indicators at said universally accessible server system in association with said universal identifier.

42. A program for tracking the environmental exposure of a particular user, residing on a computer usable medium having computer readable program code means, said program comprising:

means for accessing at a computer system in association with a particular environment a plurality of environmental indicators computed for said particular environment by a plurality of diverse electronic environmental measurement devices and converted into a common transmittable data format; and means for transmitting said plurality of environmental indicators from said computer system to a universally accessible server system in association with a particular universal identifier for said particular user, in response to detecting a particular user within a particular proximity of said particular environment, such that environmental indicators for environments to which said particular user is exposed are automatically stored at said universally accessible server system in association with said particular user.

43. A method for monitoring the suitability of an environment for a particular user, said method comprising the steps of:

receiving at a universally accessible server system in association with a particular universal identifier for a particular user a plurality of environmental indicators computed for a particular environment by a plurality of diverse electronic environmental measurement devices and converted into a common transmittable data format;

comparing said plurality of environmental indicators for said particular environment with an environmental sensitivity profile for said particular user retrieved from said universally accessible server system in association with said particular universal identifier; and controlling output of a recommendation of suitability of said particular environment for said particular user, in response to said comparison of said plurality of environmental indicators with said environmental sensitivity profile, such that said particular user receives an indication of whether said particular environment is suitable for said particular user.

44. The method for monitoring the suitability of an environment for a particular user according to claim 43, said method further comprising the step of:

controlling output of a warning signal to said particular user if said particular environment is unsuitable for said particular user.

45. A system for monitoring the suitability of an environment for a particular user, said system comprising:

means for receiving at a universally accessible server system in association with a particular universal identifier for a particular user a plurality of environmental indicators computed for a particular environment by a plurality of diverse electronic environmental measurement devices and converted into a common transmittable data format;

means for comparing said plurality of environmental indicators for said particular environment with an environmental sensitivity profile for said particular user retrieved from said universally accessible server system in association with said particular universal identifier; and means for controlling output of a recommendation of suitability of said particular environment for said particular user, in response to said comparison of said plurality of environmental indicators with said environmental sensitivity profile, such that said particular user receives an indication of whether said particular environment is suitable for said particular user.

46. The system for monitoring the suitability of an environment for a particular user according to claim 45, said system further comprising:

means for controlling output of a warning signal to said particular user if said particular environment is unsuitable for said particular user.

47. A program monitoring the suitability of an environment for a particular user, residing on a computer usable medium having computer readable program code means, said program comprising:

means for receiving at a universally accessible server system in association with a particular universal identifier for a particular user a plurality of environmental indicators computed for a particular environment by a plurality of diverse electronic environmental measurement devices and converted into a common transmittable data format means for enabling comparison of said plurality of environmental indicators for said particular environment with an environmental sensitivity profile for said particular user retrieved from said universally accessible server system in association with said particular universal identifier; and means for controlling output of a recommendation of suitability of said particular environment for said particular user, in response to said comparison of said plurality of environmental indicators with said environmental sensitivity profile, such that said particular user receives an indication of whether said particular environment is suitable for said particular user.

48. The program for monitoring the suitability of an environment for a particular user according to claim 47, said program further comprising:

means for controlling output of a warning signal to said particular user if said particular environment is unsuitable for said particular user.

49. A method for managing a controllable environment, said method comprising the steps of:

accessing at a computer system a plurality of environmental indicators in a common transmittable data format that are computed for a particular environment by a plurality of diverse electronic environmental measurement devices;

accessing at said computer system an environmental sensitivity profile for a particular user from a universally accessible storage medium, in response to a user enabling transmittal of said environmental sensitivity profile from said universally accessible storage medium to said computer system;

comparing said plurality of environmental indicators for said particular environment with said environmental sensitivity profile for said particular user; and transmitting control signals for adjusting said particular environment from said computer system to a plurality of environment control systems that each control one of a plurality of environmental parameters within said particular environment, in response to said comparison of said plurality of environmental indicators with said environmental sensitivity profile, such that said particular environment is adjusted to be suitable for said particular user.

50. A system for managing a controllable environment, said system comprising:

means for accessing at a computer system a plurality of environmental indicators in a common transmittable data format that are computed for a particular environment by a plurality of diverse electronic environmental measurement devices;

means for accessing at said computer system an environmental sensitivity profile for a particular user from a universally accessible storage medium, in response to a user enabling transmittal of said environmental sensitivity profile from said universally accessible storage medium to said computer system;

means for comparing said plurality of environmental indicators for said particular environment with said environmental sensitivity profile for said particular user; and means for transmitting control signals for adjusting said particular environment from said computer system to a plurality of environment control systems that each control one of a plurality of environmental parameters within said particular environment, in response to said comparison of said plurality of environmental indicators with said environmental sensitivity profile, such that said particular environment is adjusted to be suitable for said particular user.

51. A universally accessible database of server systems comprising:

a plurality of universally accessible server systems each with access respectively to a particular data storage medium from among a plurality of data storage mediums, wherein said particular data storage medium comprises a plurality of environmental sensitivities stored for a particular user according to a particular universal identifier;

a communication interface between said plurality of universally accessible server systems and a controller for a plurality of environmental control systems for accessing said plurality of environmental sensitivities at said controller in association with said universal identifier.

52. The universally accessible database of server systems according to claim 51, said system further comprising:

an account server system comprising a lookup database of a plurality of universal identifiers, wherein said plurality of universally accessible server systems is accessible as associated respectively with said plurality of universal identifiers.

53. The universally accessible database of server systems according to claim 51, wherein said particular data storage medium further comprises an environmental exposure database for said particular user in association with said universal identifier.

54. The universally accessible database of server systems according to claim 51, said controller further comprising:

means for analyzing a particular environment according to said plurality of environmental sensitivities for said particular user; and means for controlling parameters of said particular environment to be suitable for said particular user by controlling said plurality of environmental control systems for said particular environment.

55. The universally accessible database of server systems according to claim 54, said controller further comprising an output interface for alerting said particular user if said particular environment is unsuitable for said particular user in view of said plurality of environmental sensitivities.

* * * * *